Patented May 11, 1954

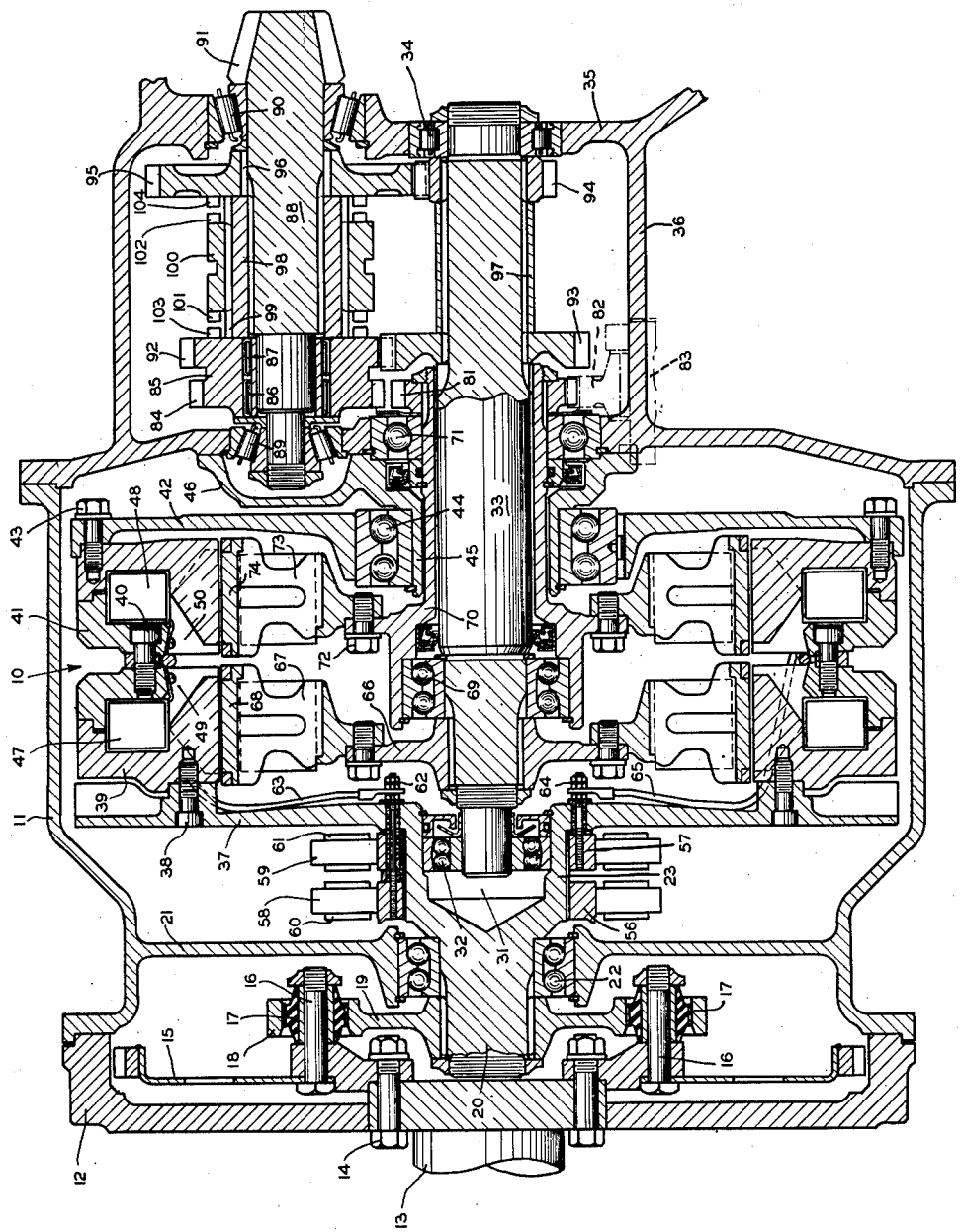

2,677,970

UNITED STATES PATENT OFFICE 2,677,970

DRIVE MEANS

Robert Lapsley, Buchanan, Mich., assignor to Clark Equipment Company, Buchanan, Mich., a corporation of Michigan Application April 22, 1952, Serial No. 283,552

6 Claims. (Cl. 74—330)

My present invention relates generally to drive means, and, more specifically, is directed to a transmission.

Drive means of the general character to which my present invention relates comprises a pair of rotatable flywheel casings each of which carries an enclosed magnetic core or field winding. The flywheel casings are driven conjointly by the crankshaft of a prime mover. Associated with the flywheel casings are annular pole pieces which are each secured to a separate drive shaft or sleeve member. Suitable change speed gear means is provided between the drive shafts and an output shaft. When it is desired to transmit torque between one of the flywheel casings and the adjacent pole piece, the associated magnetic core is electrically energized. Upon energization of the magnetic core, an eddy current is set up within the flywheel casing which tends to attract the pole piece for conjoint rotation therewith.

The gear means between the drive shafts and the output shaft is so arranged that forward drive is selectively effected by electrically energizing one of the magnetic cores and reverse drive is effected by selectively electrically energizing the other of the magnetic cores. The desired speed ratio in either forward or reverse drive is selected by means of a manually shiftable clutch collar member associated with the change speed gear means.

In the combination electrodynamic clutch and transmission unit described above, the amount of current introduced into the desired magnetic core effects control of the magnetic field between the flywheel casing and the adjacent pole piece thus determining the amount of slippage that will take place between the rotating elements. For the proper operation of the above described assembly, it is necessary to maintain a very small and uniform air gap between the flywheel casings and the associated pole pieces. Since the rotating flywheel casings are quite heavy, in that they carry the magnetic cores, it is difficult to maintain the desired clearances in the commercial embodiment of the described drive means. This difficulty is further complicated by the fact that the flywheel casings in conventional electrodynamic clutch and transmission units are rigidly secured to the crankshaft of the prime mover.

It is an object of my present invention to provide a combined clutch and transmission housing having radially inwardly extending flanges in which are mounted bearing means for rigidly journaling the various rotating elements of the described drive means.

It is a further object of my present invention to drivingly connect the flywheel casings to the crankshaft of the prime mover through suitable resilient insulating means in order that precise alignment between the crankshaft and the flywheel casings is rendered unnecessary and to prevent the transference of electric currents to the crankshaft of the prime mover.

By providing a construction wherein the flywheel casings and crankshaft need not be maintained in exact or precise alignment, both the assembly and maintenance of the drive means is considerably simplified.

Now, in order to acquaint those skilled in the art with the manner of constructing and using the drive means of my present invention, I shall describe in connection with the accompanying drawing a preferred embodiment of my present invention.

The single figure of the drawing is a vertical section view taken substantially along the longitudinal axis of the drive means of my present invention.

Referring now to the drawing, there is shown the transmission mechanism of my present invention which includes clutch means, indicated generally by the reference numeral 10. The clutch means 10 comprises a pair of eddy current clutches arranged coaxially in and to end axial spaced relation as will be described more fully hereinafter.

The clutch means 10 is arranged within a housing 11 which is secured, at its forward end, to the rear end of the flywheel housing 12 of a prime mover (not shown). The prime mover includes a crankshaft 13 to the end of which is secured by bolts 14, a flywheel assembly 15. Circumferentially spaced axially rearwardly extending bolts 16 are secured within the flywheel assembly 15. Resilient insulating ring assemblies 17 are mounted concentrically about the bolts 16 and are received in circumferentially spaced openings 18 formed in a radial plate member 19 keyed to the forward end of a stub or drive shaft 20 which is aligned coaxially of the crankshaft 13. The ring assemblies 17 compensate for misalignment between the shafts 13 and 20 and electrically insulate the flywheel 15 from the plate member 19 so as to thereby eliminate "plating" at the crankshaft bearings.

The clutch means housing 11 has a radially inwardly extending web portion 21 in which is mounted a ball bearing assembly 22. The stub shaft 20 is journaled in the ball bearing assembly 22.

The stub shaft 20, rearwardly of the web portion 21 of the clutch means housing 11, is upset radially to provide an enlarged end portion 23. An axially extending opening 31 is formed in the enlarged rear end of the stub shaft 20 and disposed therein is a ball bearing assembly 32 in which is journaled the forward end of a main clutch shaft 33. The main clutch shaft 33 is journaled, at its rear end, in a roller bearing assembly 34 retained in the web portion 35 of a transmission housing 36 secured, at its forward end, to the rear end of the clutch means housing 11.

The rear end of the enlarged portion 23 of the stub shaft 20 is formed with a radially extending flange portion 37 to which, at the outer periphery thereof, is secured, by bolts 38, a first annular flywheel casing 39. Secured, by bolts 40, to the flywheel casing 39 for conjoint rotation therewith is a second flywheel casing 41. A radial flange member 42 is secured, at its outer periphery, by bolts 43, to the flywheel casing 41. The flange member 42 is journaled on the ball bearing assembly 44 which is mounted on the axially forwardly extending tubular portion 45 of a bracket member 46 secured to the forward wall of the transmission housing 36. The flywheel casings 39 and 41, respectively, carry enclosed magnetic cores or field windings 47 and 48. The flywheel casings 39 and 41 are preferably provided with air passages, such as at 49 and 50, for dissipating the heat generated within the magnetic cores 47 and 48 when the cores are being electrically energized.

The means for effecting electrical energization of the magnetic cores 47 and 48 comprises a pair of axially spaced collector rings 56 and 57 which are mounted about and electrically insulated from the outer periphery of the enlarged portion 23 of the stub shaft 20. Disposed in engagement with the collector rings 56 and 57, respectively, are brushes 58 and 59 which are secured, in a known manner, in brush holders 60 and 61. The brushes 58 and 59 are adapted to be selectively electrically connected with a source of electrical energy or potential. It is to be observed that the collector rings 56 and 57 have a diameter considerably less than the diameter of the flywheel casings 39 and 41. Thus, only a minimum amount of material is required for the rings 56 and 57. In addition, the surface speed of the rings 56 and 57, due to their small diameter, is relatively low. As a consequence, wear of the brushes 58 and 59 and rings 56 and 57 is maintained at a minimum. The rings 56 and 57 and brushes 58 and 59 are arranged intermediate of the web portion 21 of the clutch housing 11 and the flange portion 37 of the stub shaft 20. In this position, the brushes 58 and 49 and rings 56 and 57 are protected from oil leakage from the prime mover or clutch and transmission mechanism to be described in detail hereinafter.

A terminal member 62 is disposed through, and insulated from, the flanged portion 37 of the stub shaft 20 and the collector ring 57, and is threaded into engagement with the collector ring 56. A cable 63 electrically connects the magnetic core 47 with the terminal 62. A terminal member 64 is disposed through, and insulated from, the radial flange portion 37 of the stub shaft 20, and is threaded into engagement with the collector ring 57. A cable 65 electrically connects the magnetic core 48 with the terminal 64.

Splined to the main clutch shaft 33, immediately rearwardly of the ball bearing assembly 32, is a hub member 66 to which is bolted a first rotor 67 having an annular pole piece 68. The pole piece 68 is of substantially the same axial extent as the flywheel casing 39. A slight clearance or air gap is maintained between the flywheel casing 39 and the pole piece 68.

When the brush 58 is connected to a source of electrical energy, the magnetic core 47 is electrically energized. Upon energization of the core 47, an eddy current is set up within the flywheel casing 39 which tends to attract the pole piece 68 for conjoint rotation therewith. Slippage between the flywheel casing 39 and the pole piece 68 may be controlled by varying the amount of current flowing to the magnetic core 47.

A ball bearing assembly 69 is mounted on the main clutch shaft 33 immediately rearwardly of the rotor 67. Journaled on the ball bearing assembly 69 is the forward end of an axially rearwardly extending tubular sleeve member 70. The sleeve member 70 at its rear end is journaled in a ball bearing assembly 71 retained in the forward end wall of the transmission housing 36. Secured, by a plurality of circumferentially spaced bolts 72, to the sleeve member 70 is a second rotor 73 which has an annular pole piece 74. The pole piece 74 is of substantially the same axial extent as the flywheel casing 41. A small but uniform air gap is maintained between the pole piece 74 and the flywheel casing 41.

When the brush 59 is connected to a source of electrical energy, the magnetic core 48 is electrically energized. Upon energization of the magnetic core 48, an eddy current is set up within the flywheel casing 41 which tends to attract the pole piece 74 for conjoint rotation therewith.

Secured to the rear end of the sleeve member 70 is a gear 81 which has meshing engagement with a reverse idler gear 82 mounted on a lay shaft 83. The reverse idler gear 82 and the lay shaft 83 are shown revolved out of their normal position for the sake of clarity. The reverse idler gear 82 has meshing engagement with the gear portion 84 of a compound gear member 85 rotatably mounted on needle bearing assemblies 86 and 87 carried on an output shaft 88 located vertically above the main clutch shaft 33. The output shaft 88, at its forward end, is journaled in a tapered roller bearing assembly 89, retained in the forward end wall of the transmission housing 36, and the output shaft 88, at its rear end, is journaled in a tapered roller bearing assembly 90, retained in the rear web portion 35 of the transmission housing 36. The output shaft 88, at its rear end, is provided with a bevel pinion portion 91 which is adapted to be disposed in driving engagement with the bevel gear of a differential mechanism associated with the drive axles of a vehicle in which the transmission mechanism of my present invention is embodied.

The compound gear 85 has a gear portion 92 which is disposed in meshing engagement with a gear 93 secured to the main clutch shaft 33 immediately rearwardly of gear 81. A gear 94 is secured to the main clutch shaft 33, adjacent the rear end thereof, and has meshing engagement with a gear 95 journaled on a bushing member 96 disposed concentrically about the output shaft 88. The gears 93 and 94, secured to the clutch shaft 33, are spaced axially by means of a spacer member 97. The compound gear 85 and the gear 95, mounted on the output shaft 88, are spaced by means of a hub member 98 which is keyed to the output shaft 88. The hub member 98, at its outer periphery, is formed with external straight splines 99 on which is slidably mounted a clutch collar member 100 having circumferentially spaced radially extending jaw clutch teeth 101 and 102 formed at opposite ends thereof. The jaw clutch teeth 101 are adapted to be disposed selectively in engagement with circumferentially spaced radially extending jaw clutch teeth 103 formed at the rear vertical surface of the compound gear 85, and the jaw clutch teeth 102 are adapted to be disposed selectively in engagement with circumferentially spaced radially extending jaw clutch teeth 104 formed at the forward vertical surface of the gear 95. Now, when the jaw clutch teeth 101 and 103 are in engagement, the compound gear 85 is clutched to the output shaft 88, and, when the jaw clutch teeth 102 and 104 are in engagement, the gear 95 is clutched to the output shaft 88.

When it is desired to drive the transmission output shaft 88 in high ratio (low speed) forward drive, the clutch collar member 100 is shifted to the right, from the position shown in Figure 1, until the jaw clutch teeth 102 and 104 are disposed in engagement and the gear 95 is clutched to the output shaft 88. The magnetic core 47 is then electrically energized which, when the flywheel casing 39 is rotating, causes the pole piece 68 to rotate conjointly therewith. High ratio forward drive is then effected between the pole piece 68 and the output shaft 88 through the rotor 67, hub member 66, shaft 33, gear 94 and gear 95.

When low ratio (high speed) forward drive is desired, the clutch collar member 100 is shifted to the left from the position shown in Figure 1 thereby disposing the clutch teeth 101 and 103 in engagement for clutching the compound gear member 85 to the output shaft 88. Assuming that the magnetic core 47 is electrically energized, low ratio forward drive is effected between the pole piece 68 and the output shaft 88 through the rotor 67, hub member 66, shaft 33, gear 93 and the gear portion 92 of the compound gear member 85.

In the event that reverse drive is desired, the magnetic core 47 is de-energized and the magnetic core 48 energized, which causes the pole piece 74 to rotate conjointly with the flywheel casing 41. Rotation of the pole piece 74 causes rotation of the rotor 73 and sleeve member 70. If high ratio (low speed) drive in a reverse direction is desired, the clutch collar member 100 is moved to the right from the position shown in Figure 1, thereby disposing the jaw clutch teeth 102 and 104 in engagement and causing the gear 95 to be clutched to the output shaft 88. Drive is thus effected between the sleeve member 70 and the output shaft 88 through the gear 81, reverse idler gear 82, gear portion 84 of the compound gear 85, gear portion 92 of the compound gear 85, gear 93, main clutch shaft 33, gear 94 and gear 95. Now, if low ratio (high speed) reverse drive is desired, the clutch collar 100 is shifted to the left from the position shown in Figure 1, thereby disposing the jaw clutch teeth 101 and 103 in engagement for clutching the compound gear 85 to the output shaft 88. Drive is now effected between the sleeve member 70 and the output shaft 88 through the gear 81, reverse idler gear 82, and gear portion 84 of the compound gear 85.

In the two speed forward, two speed reverse, transmission mechanism described, the direction of drive may be selectively reversed quickly and without gear clash through the selective energization and de-energization of the pair of eddy current clutches.

It is to be noted that the elements of the clutch means 10 are rigidly mounted for rotation through the bearing means 22, 32, 69, 44, 71 and 34. It is to be further noted that the clutch means 10 is mounted independently of the crankshaft 13, thus obviating the necessity of the clutch means 10 and crankshaft 13 being assembled and maintained in exact or precise alignment.

Now, although I have shown and described a preferred embodiment of my present invention, it will be understood that various modifications and rearrangements may be made therein without departing from the spirit and scope of my present invention.

I claim:

1. In combination, a housing having first, second and third radially inwardly extending flange members, a drive shaft, first bearing means secured in said first flange member for providing a journaled support for said drive shaft intermediate of the ends thereof, a main shaft, second bearing means secured within the rear end of said drive shaft for providing a journaled support for the forward end of said main shaft, third bearing means mounted in said third flange member for providing a journaled support for the rear end of said main shaft, a first sleeve member disposed concentrically about said main shaft intermediate of the ends thereof, fourth bearing means between the forward end of said first sleeve member and said main shaft, fifth bearing means mounted in said second flange member for providing a journaled support for the rear end of said first sleeve member, a second sleeve member disposed concentrically about said first sleeve member and being secured at its rear end to said second flange member, first and second coaxially arranged annular flywheel casings secured to the rear end of said drive shaft for conjoint rotation therewith, an annular flange member mounted for conjoint rotation with said first and second flywheel casings at the rear end thereof, sixth bearing means mounted on said second sleeve member for providing a journaled support for said rotatable annular flange member, said sixth bearing means being located intermediate of said fourth and fifth bearing means, said first and second flywheel casings each having an annular magnetic coil disposed therein, first and second rotors associated with said first and second flywheel casings, one of said rotors having connection with said main shaft intermediate of said second and fourth bearing means, the other of said rotors having connection with the forward end of said first sleeve member intermediate of said fourth and sixth bearing means, a first drive gear secured to the rear end of said main shaft, and a second drive gear secured to the rear end of said first sleeve member.

2. In combination, a housing having first, second and third radially inwardly extending flange members, a drive shaft, first bearing means secured in said first flange member for providing a journaled support for said drive shaft intermediate of the ends thereof, a main shaft, second bearing means secured within the rear end of said drive shaft for providing a journaled support for the forward end of said main shaft, third bearing means mounted in said third flange member for providing a journaled support for the rear end of said main shaft, a first sleeve member disposed concentrically about said main shaft intermediate of the ends thereof, fourth bearing means between the forward end of said first sleeve member and said main shaft, fifth bearing means mounted in said second flange member for providing a journaled support for the rear end of said first sleeve member, a second sleeve member disposed concentrically about said first sleeve member and being secured at its rear end to said second flange member, first and second coaxially arranged annular flywheel casings secured to the rear end of said drive shaft for conjoint rotation therewith, an annular flange member mounted to the rear end of said first and second flywheel casings for conjoint rotation therewith, sixth bearing means mounted on said second sleeve member intermediate of said foutrh and fifth bearing means for providing a journaled support for said rotatable annular flange member, said first and second flywheel casings each having an annular magnetic coil disposed therein, first and second rotors associated with said first and second flywheel casings, one of said rotors having connection with said main shaft intermediate of said second and fourth bearing means, the other of said rotors having connection with the forward end of said first sleeve member intermediate of said fourth and sixth bearing means, an output shaft, seventh bearing means mounted in said second flange member for providing a journaled support for the forward end of said output shaft, eighth bearing means mounted in said third flange member for providing a journaled support for the rear end of said output shaft, a first compound gear journaled on said output shaft adjacent the forward end thereof, a second gear secured to the rear end of said first sleeve member, a reverse idler gear having meshing engagement with said first compound gear and said second gear, a third gear secured to said main shaft and having meshing engagement with said first compound gear, a fourth gear journaled on said output shaft adjacent the rear end thereof, a fifth gear secured to said main shaft and having meshing engagement with said fourth gear, and an axially shiftable clutch collar member mounted on said output shaft for selectively clutching either said first compound gear or said fourth gear to said output shaft.

3. For use with a prime mover having a crankshaft, the combination of a housing having first, second and third radially inwardly extending flange members, a drive shaft, resilient means for mounting the forward end of said drive shaft to the rear end of said crankshaft, first bearing means secured in said first flange member for providing a journaled support for said drive shaft intermediate of the ends thereof, a main shaft, second bearing means secured within the rear end of said drive shaft for providing a journaled support for the forward end of said main shaft, third bearing means mounted in said third flange member for providing a journaled support for the rear end of said main shaft, a first sleeve member disposed concentrically about said main shaft intermediate of the end thereof, fourth bearing means between the forward end of said first sleeve member and said main shaft, fifth bearing means mounted in said second flange member for providing a journaled support for the rear end of said first sleeve member, a second sleeve member disposed concentrically about said first sleeve member and being secured at its rear end to said second flange member, first and second coaxially arranged annular flywheel casings secured to the rear end of said drive shaft for conjoint rotation therewith, an annular flange member mounted to said first and second flywheel casings at the rear end thereof for conjoint rotation therewith, sixth bearing means mounted on said second sleeve member intermediate of said fourth and fifth bearing means for providing a journaled support for said rotatable annular flange member, said first and second flywheel casings each having an annular magnetic coil disposed therein, first and second rotors associated with said first and second flywheel casings, one of said rotors having connection with said main shaft intermediate of said second and fourth bearing means, the other of said rotors having connection with the forward end of said first sleeve member intermediate of said fourth and sixth bearing means, a first drive gear secured to said main shaft, and a second gear secured to said first sleeve member adjacent the rear end thereof.

4. For use with a prime mover having a crankshaft, the combination of, a housing having first, second and third radially inwardly extending flange members, a drive shaft, resilient means for mounting the forward end of said drive shaft to the rear end of said crankshaft, first bearing means secured in said first flange member for providing a journaled support for said drive shaft intermediate of the ends thereof, a main shaft, second bearing means secured within the rear end of said drive shaft for providing a journaled support for the forward end of said main shaft, a third bearing means mounted in said third flange member for providing a journaled support for the rear end of said main shaft, a first sleeve member disposed concentrically about said main shaft intermediate of the ends thereof, fourth bearing means between the forward end of said first sleeve member and said main shaft, fifth bearing means mounted in said second flange member for providing a journaled support for the rear end of said first sleeve member, a second sleeve member disposed concentrically about said first sleeve member and being secured at its rear end to said second flange member, first and second coaxially arranged annular flywheel casings secured to the rear end of said drive shaft for conjoint rotation therewith, an annular flange member mounted to the rear end of said first and second flywheel casings for conjoint rotation therewith, sixth bearing means mounted on said second sleeve member intermediate of said fourth and fifth bearing means for providing a journaled support for said rotatable annular flange member, said first and second flywheel casings each having an annular magnetic coil disposed therein, first and second rotors associated with said first and second flywheel casings, one of said rotors having connection with said main shaft intermediate of said second and fourth bearing means, the other of said rotors having connection with the forward end of said first sleeve member intermediate of said fourth and sixth bearing means, an output shaft, seventh bearing means mounted in said second flange member for providing a journaled support for the forward end of said output shaft, eighth bearing means mounted in said third flange member for providing a journaled support for the rear end of said output shaft, a first compound gear journaled on said output shaft adjacent the forward end thereof, a second gear secured to said first sleeve member at the rear end thereof, a reverse idler gear having meshing engagement with said first compound gear and said second gear, a third gear secured to said main shaft and having meshing engagement with said first compound gear, a fourth gear journaled on said output shaft adjacent the rear end thereof, a fifth gear secured to said main shaft and having meshing engagement with said fourth gear, and an axially shiftable clutch collar member mounted on said output shaft for selectively clutching either said first compound gear or said fourth gear to said output shaft.

5. For use with a prime mover having a crankshaft, the combination of a housing having first, second and third radially inwardly extending flange members, a drive shaft, insulating means for mounting the forward end of said drive shaft to the rear end of said crankshaft, first bearing means secured in said first flange member for providing a journaled support for said drive shaft intermediate of the ends thereof, a main shaft, second bearing means secured within the rear end of said drive shaft for providing a journaled support for the forward end of said main shaft, third bearing means mounted in said third flange member for providing a journaled support for the rear end of said main shaft, a first sleeve member disposed concentrically about said main shaft intermediate of the ends thereof, fourth bearing means between the forward end of said first sleeve member and said main shaft, fifth bearing means mounted in said second flange member for providing a journaled support for the rear end of said first sleeve member, a second sleeve member disposed concentrically about said first sleeve member and being secured at its rear end to said second flange member, first and second coaxially arranged annular flywheel casings secured to the rear end of said drive shaft for conjoint rotation therewith, an annular flange member mounted to said first and second flywheel casings at the rear end thereof for conjoint rotation therewith, sixth bearing means mounted on said second sleeve member intermediate of said fourth and fifth bearing means for providing a journaled support for said rotatable annular flange member, said first and second flywheel casings each having an annular magnetic coil disposed therein, first and second rotors associated with said first and second flywheel casings, one of said rotors having connection with said main shaft intermediate of said second and fourth bearing means, the other of said rotors having connection with the foward end of said first sleeve member intermediate of said fourth and sixth bearing means, a first drive gear secured to said main shaft, and a second gear secured to said first sleeve member adjacent the rear end thereof.

6. For use with a prime mover having a crankshaft, the combination of a housing having first, second and third radially inwardly extending flange members, a drive shaft, resilient insulating means for mounting the forward end of said drive shaft to the rear end of said crankshaft, first bearing means secured in said first flange member for providing a journaled support for said drive shaft intermediate of the ends thereof, a main shaft, second bearing means secured within the rear end of said drive shaft for providing a journaled support for the forward end of said main shaft, third bearing means mounted in said third flange member for providing a journaled support for the rear end of said main shaft, a first sleeve member disposed concentrically about said main shaft intermediate of the ends thereof, fourth bearing means between the forward end of said first sleeve member and said main shaft, fifth bearing means mounted in said second flange member for providing a journaled support for the rear end of said first sleeve member, a second sleeve member disposed concentrically about said first sleeve member and being secured at its rear end to said second flange member, first and second coaxially arranged annular flywheel casings secured to the rear end of said drive shaft for conjoint rotation therewith, an annular flange member mounted to said first and second flywheel casings at the rear end thereof for conjoint rotation therewith, sixth bearing means mounted on said second sleeve member intermediate of said fourth and fifth bearing means for providing a journaled support for said rotatable annular flange member, said first and second flywheel casings each having an annular magnetic coil disposed therein, first and second rotors associated with said first and second flywheel casings, one of said rotors having connection with said main shaft intermediate of said second and fourth bearing means, the other of said rotors having connection with the forward end of said first sleeve member intermediate of said fourth and sixth bearing means, a first drive gear secured to said main shaft, and a second gear secured to said first sleeve member adjacent the rear end thereof.

References Cited in the file of this patent

UNITED STATES PATENTS

| Number | Name | Date |
|---|---|---|
| 2,355,709 | Dodge | Aug. 15, 1944 |
| 2,485,688 | Banker | Oct. 25, 1949 |
| 2,549,896 | Dunham | Apr. 24, 1951 |